US012332683B2

(12) United States Patent
Varma et al.

(10) Patent No.: US 12,332,683 B2
(45) Date of Patent: *Jun. 17, 2025

(54) SYNCHRONOUS RESET DEASSERTION CIRCUIT

(71) Applicant: Achronix Semiconductor Corporation, Santa Clara, CA (US)

(72) Inventors: Namit Varma, Karnataka (IN); Sarma Jonnavithula, Bangalore (IN); Mohan Krishna Vedam, Karantaka (IN); Christopher C. LaFrieda, Ridgefield, NJ (US); Virantha N. Ekanayake, Baltimore, MD (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 18/108,239

(22) Filed: Feb. 10, 2023

(65) Prior Publication Data
US 2023/0195162 A1   Jun. 22, 2023

Related U.S. Application Data

(63) Continuation of application No. 17/491,745, filed on Oct. 1, 2021, now Pat. No. 11,681,324.

(51) Int. Cl.
*G06F 1/12*    (2006.01)
*G06F 1/24*    (2006.01)

(52) U.S. Cl.
CPC . *G06F 1/12* (2013.01); *G06F 1/24* (2013.01)

(58) Field of Classification Search
CPC ..................................... G06F 1/12; G06F 1/24
See application file for complete search history.

(56) References Cited

U.S. PATENT DOCUMENTS 11,681,324 B2    6/2023   Varma et al.
2004/0155690 A1  8/2004   Andrews et al.
(Continued)

FOREIGN PATENT DOCUMENTS

CN    118339528 A      7/2024
WO    2023055814       4/2023

OTHER PUBLICATIONS

"U.S. Appl. No. 17/491,745, Corrected Notice of Allowability mailed May 17, 2023", 2 pgs.
(Continued)

*Primary Examiner* — Zahid Choudhury
(74) *Attorney, Agent, or Firm* — Schwegman Lundberg & Woessner, P.A.

(57) ABSTRACT

Distribution of a reset signal across a system-on-chip (SoC) may be the highest latency signal in the circuit. As a result, the operating frequency of the device is reduced to ensure that the reset signal reaches all intellectual property (IP) blocks during a single clock cycle. A reset synchronizer receives the clock signal and the reset signal as inputs and generates a synchronous reset signal as an output. The synchronous reset signal has a fixed timing relationship with the clock signal. The clock signal may be paused when a reset signal is received. As a result, distribution of the synchronous reset signal may be performed without regard to the latency of the signal. After the synchronous reset signal has been received by all of the IP blocks, reset is deasserted and the clock signal is resumed.

20 Claims, 11 Drawing Sheets

(56) References Cited

U.S. PATENT DOCUMENTS

| | | |
|---|---|---|
| 2005/0179476 A1 | 8/2005 | Sweet |
| 2006/0033541 A1 | 2/2006 | Ishikawa |
| 2007/0006010 A1* | 1/2007 | Wallner ............... G11C 11/4096 |
| | | 713/500 |
| 2012/0074991 A1 | 3/2012 | Kurlagunda et al. |
| 2012/0110364 A1* | 5/2012 | Bhargava ................. G06F 1/12 |
| | | 713/400 |
| 2013/0069697 A1 | 3/2013 | Nunes |
| 2022/0187887 A1* | 6/2022 | Kimura ..................... G06F 1/04 |
| 2022/0247411 A1* | 8/2022 | Lan ........................... H03L 7/00 |
| 2023/0106841 A1 | 4/2023 | Varma et al. |

OTHER PUBLICATIONS

"U.S. Appl. No. 17/491,745, Corrected Notice of Allowability mailed Feb. 7, 2023".

"U.S. Appl. No. 17/491,745, Notice of Allowance mailed Jan. 19, 2023".

"International Application Serial No. PCT/US2022/045057, International Search Report mailed Dec. 30, 2022", 2 pgs.

"International Application Serial No. PCT/US2022/045057, Written Opinion mailed Dec. 30, 2022", 9 pgs.

"European Application Serial No. 22877260.4, Response filed Nov. 11, 2024 to Communication pursuant to Rules 161(1) and 162 EP", w/ claims, 14 pgs.

"International Application Serial No. PCT/US2022/045057, International Preliminary Report on Patentability mailed Apr. 11, 2024", 11 pgs.

\* cited by examiner

SYNCHRONOUS RESET DEASSERTION CIRCUIT

PRIORITY APPLICATIONS

This application is a continuation of U.S. patent application Ser. No. 17/491,745, filed Oct. 1, 2021, the content of which is incorporated herein by reference in its entirety.

BACKGROUND

Field-programmable gate arrays (FPGAs) are integrated circuits customized after manufacture. An FPGA comprises an array of logic blocks comprising elements such as lookup tables (LUTs), adders, and flip-flops, as well as more complex intellectual property (IP) blocks.

A reset signal may be distributed to all logic blocks on the FPGA. The reset signal causes each logic block to reset to a known state.

BRIEF DESCRIPTION OF THE DRAWINGS

Some embodiments of the disclosed technology are illustrated by way of example and not limitation in the figures of the accompanying drawings.

DETAILED DESCRIPTION

Figure 1:
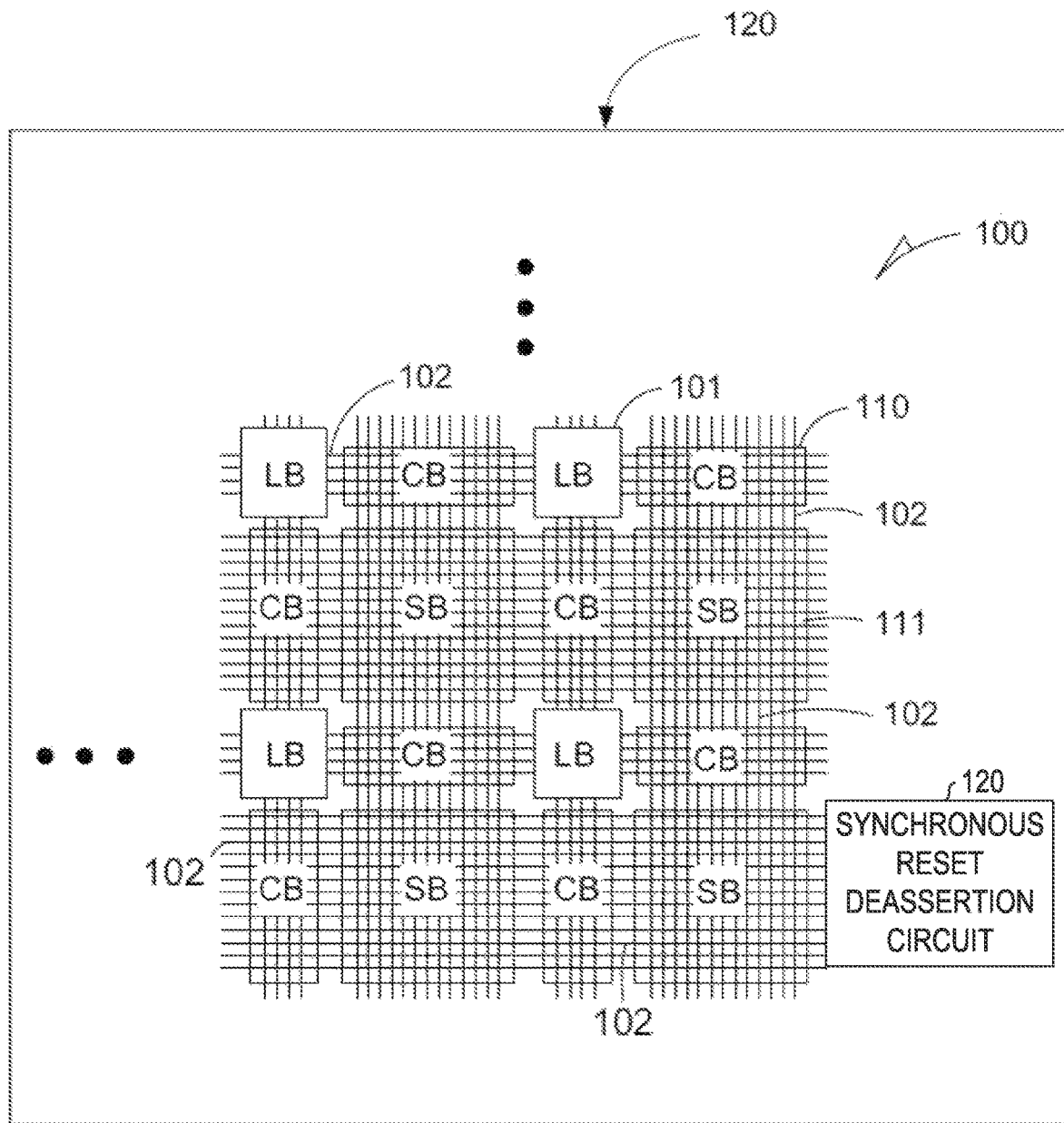
FIG. 1 is a diagrammatic view of an example circuit chip fabric.

Example methods, systems, and circuits for synchronously deasserting a reset signal to multiple IP blocks of a system-on-chip (SoC) (e.g., an FPGA or an application-specific integrated circuit (ASIC)) will now be described. In the following description, numerous examples having example-specific details are set forth to provide an understanding of examples. It will be evident, however, to one of ordinary skill in the art that these examples may be practiced without these example-specific details, and/or with different combinations of the details than are given here. Thus, specific examples are given for the purpose of simplified explanation, and not limitation.

IP blocks on an SoC typically provide functionality by receiving inputs and generating outputs. Additionally, these IP blocks typically receive a clock signal and a reset signal. While the reset signal is asserted (e.g., set to a low voltage value), the IP block ceases performing its normal operations and resets its internal and output states to known initialization states. For example, an accumulator may receive an input that indicates whether to add one or zero to an accumulated value on each clock cycle. The output of the accumulator may be a representation of the accumulated value. When reset is asserted, the accumulated value is reset to zero.

In many circuit designs, distribution of the reset signal across the SoC is the signal with the highest latency in the circuit. As a result, the operating frequency of the device is reduced to ensure that the reset signal reaches all IP blocks during a single clock cycle. By using the circuits and methods described herein, the clock signal is paused when a reset signal is received. As a result, distribution of the reset signal may be performed without regard to the latency of the signal. After the reset signal has been received by all of the IP blocks, reset is deasserted (e.g., set to a high voltage value) and the clock signal is resumed. Deassertion of the reset signal refers to changing the state of the reset signal to a value that the receiving IP blocks expect for normal (non-reset) operation.

The input reset signal is asynchronous. As a result, there is no constraint on the relative timing of a rising clock edge or a falling clock edge and the change in the input reset value. This may be caused, for example, by a physical reset button being pressed that has no relation to an internal clock generation circuit. Depending on the relative timing of the change in the input signal value and the next clock edge, different amounts of time will remain in the clock cycle for the input reset signal to propagate to IP blocks. Thus, various IP blocks will receive the reset signal before the next clock edge and other IP blocks will receive the reset signal after the next clock edge, with the exact division of the IP blocks depending on the precise time at which the input reset is received. This may cause unpredictable behavior during the transition in which some IP blocks are reset and others are not.

A reset synchronizer receives the clock signal and the reset signal as inputs and generates a synchronous reset signal as an output. The synchronous reset signal has a fixed timing relationship with the clock signal. As a result, the duration of time before the next clock edge can be selected to be an entire clock cycle, maximizing the time for the synchronous reset signal to propagate to the synchronous elements in the IP blocks before the next clock edge.

A clock gating circuit receives the clock signal and a control signal as inputs. If the control signal activates the clock gating circuit, the clock gating circuit passes the clock signal through. If the control signal deactivates the clock gating circuit, the clock gating circuit provides a constant output instead of providing the clock signal.

A saturating counter receives a clock signal and a reset signal as inputs, maintains an internal counter value and a fixed maximum value, and generates a signal indicating whether the internal counter value is equal to the fixed maximum value. While the reset signal is not asserted, the internal counter value is incremented on each clock cycle until it reaches the fixed maximum value. When the reset signal is asserted, the internal counter value is reset to zero.

In some example embodiments, a single saturating counter is used. The synchronized reset signal and the clock signal are provided as inputs to the saturating counter. The output of the saturating counter is used as the control signal for the clock gating circuit. Thus, the clock signal is disabled when the synchronized reset signal is asserted and is not re-enabled until a predetermined period of time after the synchronized reset signal is deasserted. As a result, the reset deassertion is allowed to propagate to all IP blocks before the clock signal is resumed.

In some example embodiments, two saturating counters are used. The second saturating counter allows the clock gating circuit to ungate the clock for a first predetermined number of clock cycles while reset is asserted, in addition to disabling the clock signal for a second predetermined number of clock cycles after reset is deasserted. This provides support for IP blocks that make use of clock edges while reset is asserted.

Additional saturating counters may be used to provide for additional states during reset. For example, reset may be asserted and the clock disabled during a first state, reset asserted and the clock enabled during a second state, reset asserted and the clock disabled (again) during a third state, reset deasserted and the clock disabled during a fourth state, and reset deasserted and the clock enabled during a fifth state. Depending on the IP blocks being controlled by the synchronous reset deassertion circuit, the duration of time in each state and the particular states being used may be selected.

FIG. 1 is a diagrammatic view of an example circuit chip fabric 100, according to various examples of the invention. The fabric 100 contains programmable arrays of logic blocks 101 that support a variety of programmable logic functions. Routing tracks 102 in the fabric 100, illustrated as a plurality of orthogonally oriented tracks, are used to carry electronic signals and implement reconfigurable interconnections between the logic blocks 101. The major elements of a flexible routing architecture used to interconnect the routing tracks and configure the logic blocks include connection boxes 110 and switch boxes 111.

In implementation, the switch boxes 111 can be switches that connect wires to wires (e.g., the wires in the horizontal and vertical routing tracks: wires in horizontal tracks to wires in horizontal tracks, wires in vertical tracks to wires in vertical tracks, and wires in horizontal tracks to wires in vertical tracks). The connection boxes 110 can be switches that connect wires in horizontal and/or vertical tracks to the logic block 101 elements. For purposes of illustration, only exemplary elements in the drawing figure have been marked. However, a person of ordinary skill in the art will understand that the routing tracks 102, the connection boxes 110, and the switch boxes 111 can, in practice, be replicated over the surface of a semiconductor chip in order to provide the desired interconnection functionality.

The structure of the connection boxes 110 and the switch boxes 111 determine the connections of the routing tracks 102 to the logic blocks 101, thereby determining the functionality of a semiconductor chip 120 that includes them. For example, a semiconductor chip 120 that includes the fabric 100 may be fabricated as an FPGA, such as the type available from Achronix™, Xilinx™, Altera™, and other vendors.

In some examples, reset and clock signals to the logic blocks 101 are intermediated by a synchronous reset deassertion circuit 120. As a result, the operating frequency of the fabric 100 may be determined based on the propagation delay of input and output signals among the logic blocks 101 without regard to the propagation delay of the reset signal. An increase in operating frequency improves the functionality of the fabric 100.

Figure 2:
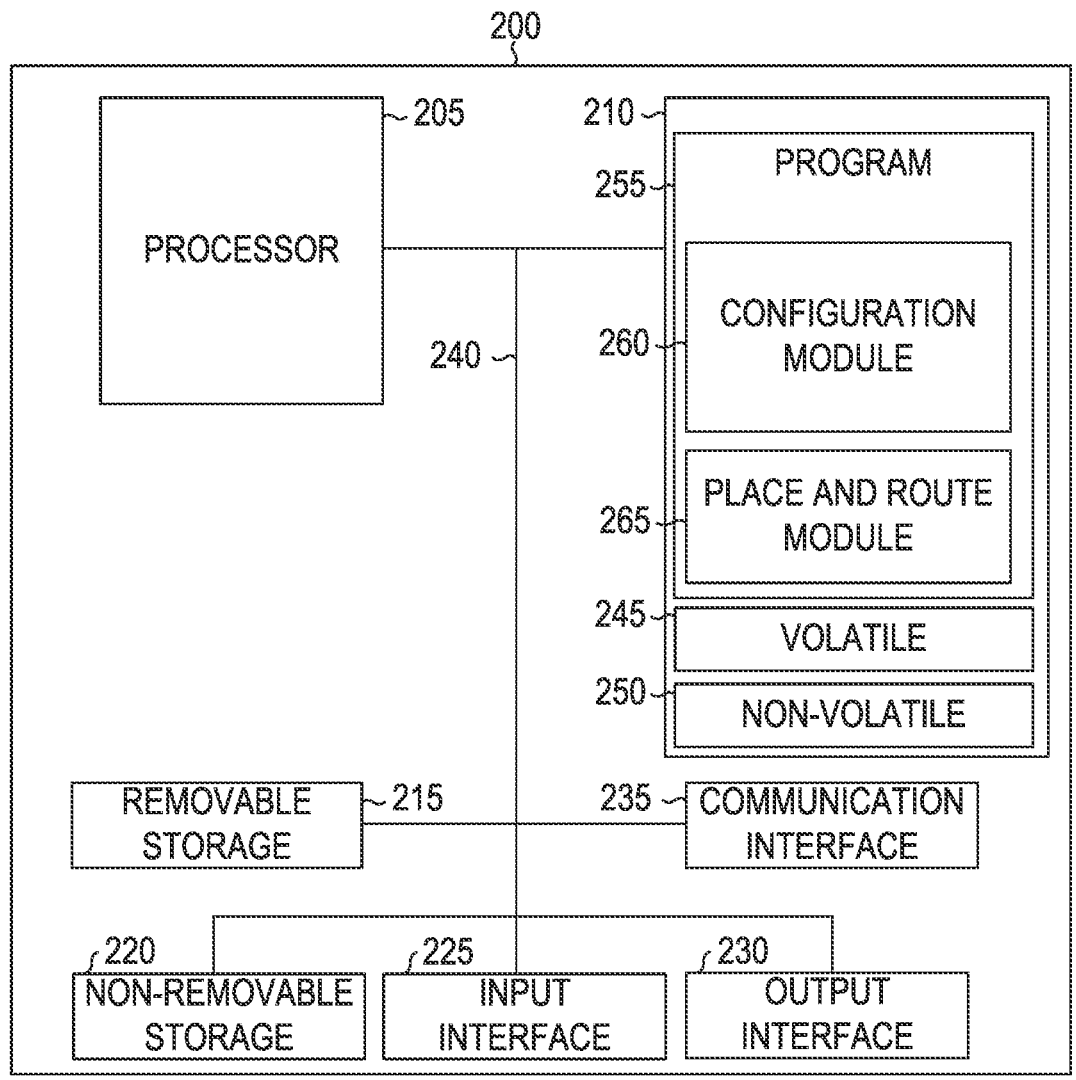
FIG. 2 is a block diagram illustrating components of an example system that programs an FPGA.

FIG. 2 is a block diagram illustrating components of a computer 200 that programs an FPGA, according to some examples. All components need not be used in various embodiments. For example, clients, servers, autonomous systems, and cloud-based network resources may each use a different set of components, or, in the case of servers for example, larger storage devices.

One example computing device in the form of a computer 200 (also referred to as computing device 200 and computer system 200) may include a processor 205, memory storage 210, removable storage 215, and non-removable storage 220, all connected by a bus 240. Although the example computing device is illustrated and described as the computer 200, the computing device may be in different forms in different embodiments. For example, the computing device may instead be a smartphone, a tablet, a smartwatch, or another computing device including elements the same as or similar to those illustrated and described with regard to FIG. 2. Devices such as smartphones, tablets, and smartwatches are collectively referred to as "mobile devices." Further, although the various data storage elements are illustrated as part of the computer 200, the storage may also or alternatively include cloud-based storage accessible via a network, such as the Internet, or server-based storage.

The memory storage 210 may include volatile memory 245 and non-volatile memory 250, and may store a program 255. The computer 200 may include, or have access to, a computing environment that includes, a variety of computer-readable media, such as the volatile memory 245; the non-volatile memory 250; the removable storage 215; and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD-ROM), digital versatile disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes an input interface 225, an output interface 230, and a communication interface 235. The output interface 230 may interface to or include a display device, such as a touchscreen, that also may serve as an input device. The input interface 225 may interface to or include one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer instructions stored on a computer-readable medium (e.g., the program 255 stored in the memory storage 210) are executable by the processor 205 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 255 is shown as including a configuration module 260 and a place and route module 265. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various examples, modules described herein as being implemented within a single machine, database, or device may be distributed across multiple machines, databases, or devices.

The configuration module 260 provides a user interface to allow a user to provide a configuration for an FPGA. For example, the user interface may allow the user to identify a hardware design language (HDL) file that specifies the configuration.

The place and route module 265 programs the FPGA based on the configuration. For example, the connection boxes 110, the switch boxes 111, and the routing tracks 102 may be configured. As another example, the connections to and from LUTs, as well as their contents (i.e., the particular output generated for each combination of inputs), may be configured.

Figure 3:
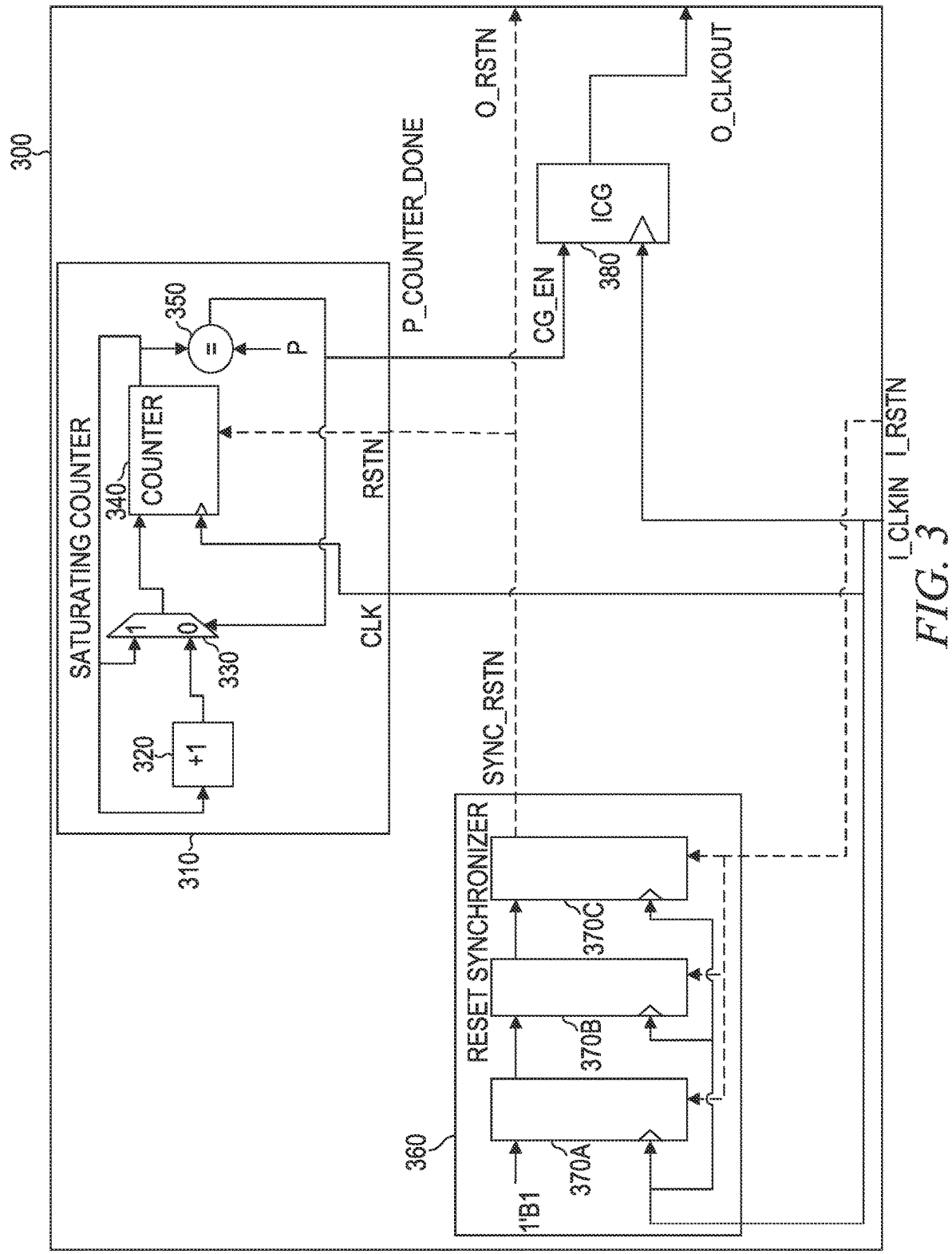
FIG. 3 is a diagrammatic view of a synchronous reset deassertion circuit, according to various example embodiments.

FIG. 3 is a diagrammatic view of a synchronous reset deassertion circuit 300, according to various embodiments of the invention. The synchronous reset deassertion circuit 300 comprises a saturating counter 310, a reset synchronizer 360, and a clock gating circuit 380. The reset synchronizer 360 comprises flip-flops 370A, 370B, and 370C. The saturating counter 310 comprises an incrementor 320, a multiplexer 330, a counter 340, and a comparator 350. The synchronous reset deassertion circuit 300 receives a clock input (I_CLKIN) and a reset input (I_RSTN) and provides a clock output (O_CLKOUT) and a reset output (O_RSTN). To make the connections easier to see, the I_RSTN and O_RSTN connections are shown as dashed lines.

I_CLKIN is provided to each of the saturating counter 310, the reset synchronizer 360, and the clock gating circuit 380. I_RSTN is provided only to the reset synchronizer 360. In the example of FIG. 3, the reset signals are active low. Active high signals are supported with minor modifications, as will be apparent to one of ordinary skill in the art.

When I_RSTN is asserted, each of the flip-flops 370A-370C is reset, setting the stored value of the flip-flop to zero. The output of the flip-flip 370C (SYNC_RSTN) is provided as the reset output of the synchronous reset deassertion circuit 300. Thus, as soon as I_RSTN is asserted, O_RSTN is also asserted.

When I_RSTN is deasserted, the value of the flip-flops 370A-370C are initially zero. The value of the flip-flop 370A is set to one on the next clock cycle. On the subsequent two clock cycles, the one value propagates to the flip-flop 370B and then to the flip-flop 370C. Thus, after three clock cycles, the output of the flip-flop 370C is changed to one and the output reset signal is deasserted. By use of the flip-flops 370A-370C, the deassertion of the output reset signal is synchronized with a clock edge. In various example embodiments, more or fewer flip-flops are used in the reset synchronizer 360 to change the number of cycles before the deassertion of O_RSTN.

While the reset signal (RSTN) to the saturating counter 310 is asserted, the counter 340 is set to zero. When RSTN is deasserted, the output of comparator 350 causes the multiplexer 330 to select the output of the incrementor 320 as the next value for the counter 340 so long as the value of the counter 340 is not equal to a predefined value P.

The comparator 350 of the saturating counter 310 compares the value of the counter 340 to P and generates a P_COUNTER_DONE signal that indicates whether the compared values were equal. While P_COUNTER_DONE is true, the multiplexer 330 causes the incrementor 320 to be bypassed, maintaining the value of the counter 340 at P. Thus, on each clock cycle, the value of the counter 340 increases by one until the value of the counter 340 reaches the predefined value P. If the counter is equal to the predefined value P, the comparator 350 causes the clock gating circuit 380 to pass through I_CLKIN as O_CLKOUT. Otherwise, the comparator 350 causes the clock gating circuit 380 to output a constant value (e.g., a logical zero value), disabling O_CLKOUT.

By use of the saturating counter 310, the output clock signal remains disabled for a predetermined period of time after the output reset signal is deasserted. This predetermined delay allows the components of a circuit that receive the output reset signal and the output clock signal to detect the reset deassertion signal before clock cycles resume. As a result, the circuit functions correctly even if the reset signal cannot be distributed across the circuit in a single clock cycle.

FIG. 3 shows an example embodiment in which the saturating counter 310 is used to control the predetermined delay between the time at which the I_RSTN signal is deasserted and the time at which the O_RSTN signal is deasserted. In an alternative embodiment, a finite state machine is used in place of the saturating counter. Pseudo-Verilog for such an implementation is shown below.

```
assign p_done=p_cnt==P;
assign o_rstn=sync_rstn;
assign cg_en=p_done;
@always(posedgei_clk or negedge sync_rstn) begin
    if(!sync_rstn)
        p_cnt<=0;
    else begin
        if(!p_done)
            p_cnt<=p_cnt+1;
        end
    end
```

An electronic design automation (EDA) tool may generate the saturating counter of FIG. 3 or another physical implementation in response to a HDL description of the finite state machine above.

Figure 4:
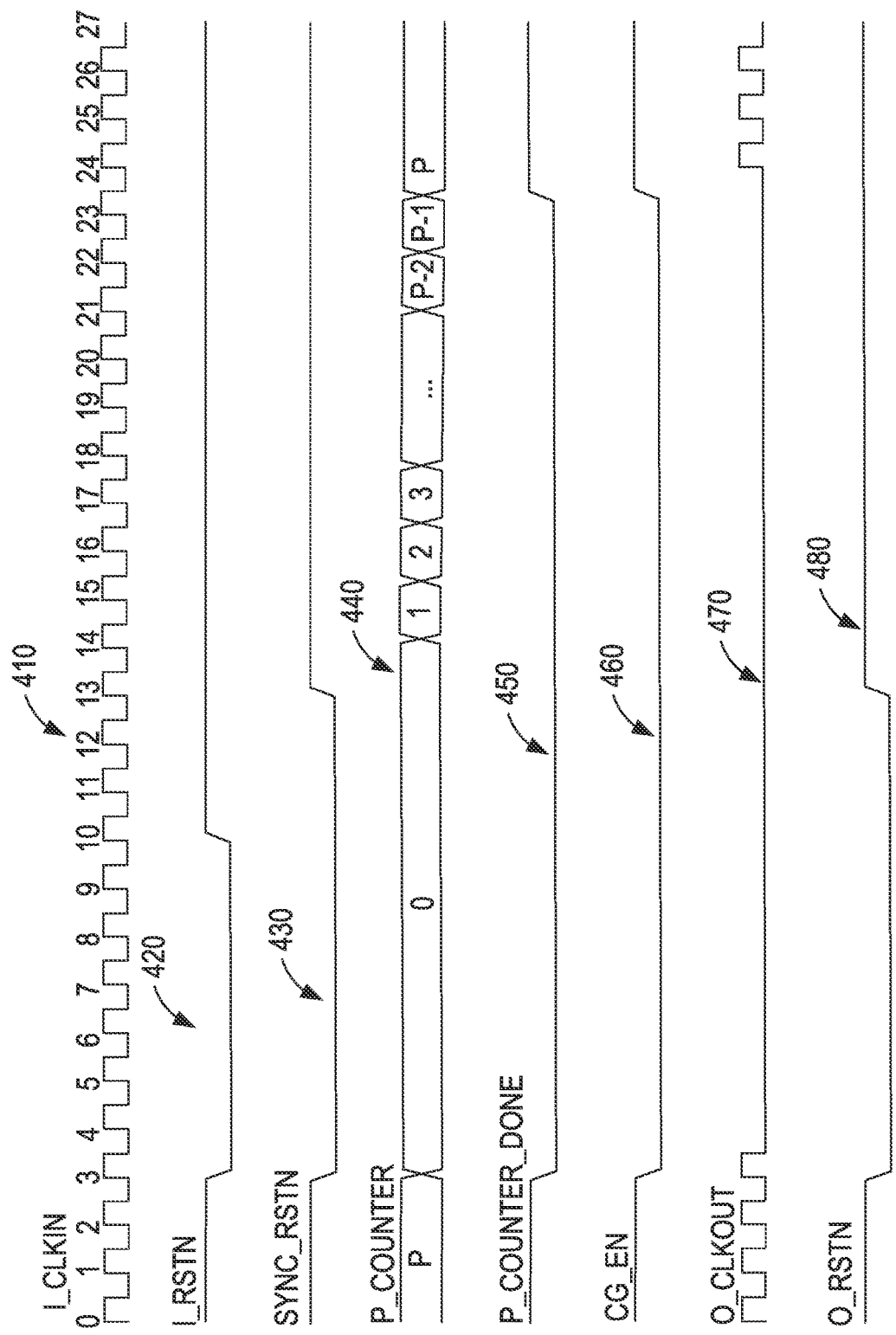
FIG. 4 is a timing diagram for the synchronous reset deassertion circuit of FIG. 3, according to various example embodiments.

FIG. 4 is a timing diagram for the synchronous reset deassertion circuit of FIG. 3, according to various embodiments of the invention. The timing diagram of FIG. 4 shows the I_CLKIN timing 410, the I_RSTN timing 420, the SYNC_RSTN timing 430, the P_COUNTER timing 440, the P_COUNTER_DONE timing 450, the CG_EN timing 460, the O_CLKOUT timing 470, and the O_RSTN timing 480.

The I_CLKIN timing 410 shows a steady clock signal being input to the synchronous reset deassertion circuit 300. The rising clock edges are numbered 0 to 27.

The I_RSTN timing 420 shows that for a first period of time, the input reset signal is inactive, then reset is asserted near clock cycle 3, and reset is deasserted near clock cycle 13. The duration of time of the assertion of the input reset signal is controlled outside of the synchronous reset deassertion circuit 300 and may be longer or shorter than that shown in FIG. 4.

The SYNC_RSTN timing 430 shows that the SYNC_RSTN signal output from the reset synchronizer 360 is initially inactive, but becomes active as soon as the I_RSTN signal becomes active. After the input reset signal is deasserted, there is a delay before the SYNC_RSTN signal is deasserted. As discussed above with respect to FIG. 3, the delay is three clock cycles when the three flip-flops 370A-370C are used.

The P_COUNTER timing 440 shows the value of the counter 340. When the SYNC_RSTN signal received as the reset signal by the saturating counter 310 is asserted, the value of the counter is reset to zero. The counter 340 does not begin incrementing the value until the next clock edge after the SYNC_RSTN signal is deasserted. Thus, the duration of the period of time that the counter is zero is controlled by the duration of the assertion of the input reset signal and the delay of the reset synchronizer 360. Thereafter, the value increments by one each clock cycle until the predetermined value of P is reached. The duration of the period of time that the counter has a value between zero and P is determined by the value of P and the clock frequency.

The P_COUNTER_DONE timing 450 shows that this signal is set to one when the P_COUNTER equals P and set to zero otherwise. The CG_EN timing 460 is the same as the P_COUNTER_DONE timing 450 since, in the example circuit of FIG. 3, the control signal to the clock gating circuit 380 is coupled to the P_COUNTER_DONE signal from the saturating counter 310.

The O_CLKOUT timing 470 shows that the output clock signal is equal to the clock input while the CG_EN signal is asserted and is a logical zero otherwise. Thus, the output clock signal is disabled during the entire period of time that reset is asserted and for a predetermined period of time afterward.

The O_RSTN timing 480 is the same as the SYNC_RSTN timing 430 since, in the example circuit of FIG. 3, the output reset signal is coupled to the SYNC_RSTN signal from the reset synchronizer 360.

Figure 5:
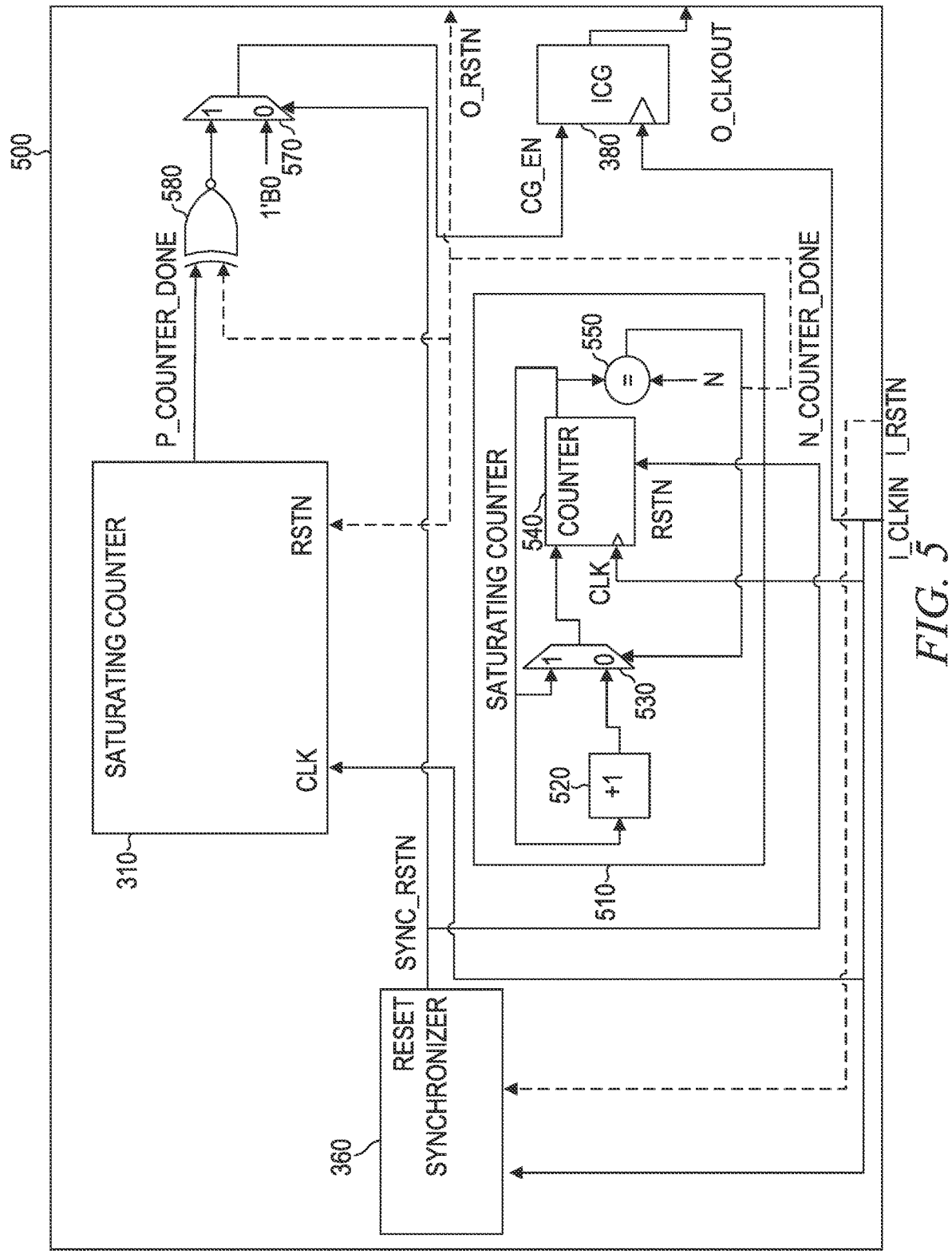
FIG. 5 is a diagrammatic view of a synchronous reset deassertion circuit, according to various example embodiments.

FIG. 5 is a diagrammatic view of a synchronous reset deassertion circuit 500, according to various example embodiments. The synchronous reset deassertion circuit 500 comprises the saturating counter 310, the reset synchronizer 360, the clock gating circuit 380, a saturating counter 510, an XNOR gate 580, and a multiplexer 570. The reset synchronizer 360 comprises flip-flops 370A, 370B, and 370C, as shown in FIG. 3. The saturating counter 310, the reset synchronizer 360, and the clock gating circuit are described above with respect to FIG. 3, though connections between the components are different in FIG. 5. To make the connections easier to see, the reset input (I_RSTN) and reset output (O_RSTN) connections are shown as dashed lines.

The clock input (I_CLKIN) is provided to each of the saturating counter 310, the reset synchronizer 360, the clock gating circuit 380, and the saturating counter 510. I_RSTN is provided only to the reset synchronizer 360. In the example of FIG. 5, the reset signals are active low. Active high signals are supported with minor modifications, as will be apparent to one of ordinary skill in the art.

When I_RSTN is asserted, the SYNC_RSTN signal is asserted. When the input reset signal is deasserted, the SYNC_RSTN signal is deasserted after a delay that is synchronized with a clock edge.

A comparator 550 of the saturating counter 510 compares the value of a counter 540 to a predefined value (N) and generates a N_COUNTER_DONE signal that indicates whether the compared values were equal or not. If the counter 540 is equal to the predefined value N, the comparator 550 causes the reset signal RSTN input to the saturating counter 310 and O_RSTN to be set to a logical one, thereby deasserting the reset signal. Otherwise, the comparator 350 causes the clock gating circuit 380 to output a logical zero value, asserting reset.

While the reset signal RSTN to the saturating counter 510 is asserted, the counter 540 is set to zero. When the reset signal RSTN to the saturating counter 510 is deasserted, the comparator 550 causes a multiplexer 530 to select the output of an incrementor 520 as the next value for the counter 540 so long as the value of the counter 540 is not equal to the predefined value N. Thus, on each clock cycle, the value of the counter 540 increases by one until the value of the counter 540 reaches the predefined value N. While the value of the counter 540 is equal to the predefined value N of the comparator 550, O_RSTN is deasserted. During the time period that the value of the counter 540 does not equal the predefined value N, O_RSTN is asserted.

Thus, when I_RSTN is asserted, SYNC_RSTN is asserted without delay and N_COUNTER_DONE becomes a logical zero, thereby asserting O_RSTN. When I_RSTN is deasserted, SYNC_RSTN is deasserted with a delay and N_COUNTER_DONE becomes a logical one after a further predetermined delay of N clock cycles, thereby deasserting O_RSTN.

The N_COUNTER_DONE signal is also an input to the XNOR gate 580 and is used as the reset input to the saturating counter 310. While the N_COUNTER_DONE is low, the saturating counter 310 is being reset and the P_COUNTER_DONE output is low. Thus, both the N_COUNTER_DONE and P_COUNTER_DONE inputs to the XNOR gate 580 are low and the output of the XNOR gate 580 is high. The multiplexer 570 selects between a constant logical zero value and the output of the XNOR gate 580.

Thus, the output of the multiplexer 570 is only a logical one when SYNC_RSTN is deasserted and N_COUNTER_DONE and P_COUNTER_DONE are equal. The output of the multiplexer 570 is coupled to the CG_EN input of the clock gating circuit 380. Accordingly, while N_COUNTER_DONE is a logical zero (resetting the saturating counter 310 and forcing P_COUNTER_DONE also to be a logical zero), the O_CLKOUT is enabled. Thus, O_CLKOUT is enabled for N cycles while O_RSTN is asserted.

After the saturating counter 510 has completed counting the N clock cycles, N_COUNTER_DONE becomes a logical one value and O_RSTN is deasserted. The saturating counter 310 begins counting P clock cycles. Until the P clock cycles are complete, the P_COUNTER_DONE value is a logical zero. When the N_COUNTER_DONE signal is a logical one and the P_COUNTER_DONE value is a logical zero, the output of the XNOR gate 580 is zero. The output of the XNOR gate 580 is selected as the output of the multiplexer 570 when SYNC_RSTN is a logical one. Thus, while SYNC_RSTN is deasserted, the saturating counter 510 has counted N clock cycles, and the saturating counter 310 has not counted P clock cycles, the CG_EN signal to the clock gating circuit 380 disables O_CLKOUT.

O_CLKOUT remains disabled for the predetermined period of time of P clock cycles, until the value of P_COUNT_DONE changes. Once both P_COUNTER_DONE and N_COUNTER_DONE are logical one values, the output of the XNOR gate 580 becomes a logical one, changing the CG_EN signal to the clock gating circuit 380 and enabling O_CLKOUT.

Thus, the synchronous reset deassertion circuit 500, like the synchronous reset deassertion circuit 300, delays the resumption of the clock signal after deasserting the reset signal to allow propagation of the reset signal to all components of a circuit. Additionally, the synchronous reset deassertion circuit 500 allows for a predetermined number of clock cycles to be provided to the circuit while the reset signal is asserted. Some circuit components may use these clock cycles to perform more complex reset operations. As a simple example, a component may store a sum of its inputs. When reset is asserted, the input values are reset to zero, but the stored sum is not reset until a clock cycle is received and an updated addition operation is performed.

FIG. 5 shows an example embodiment in which two saturating counters are used to control the predetermined delays N and P. In an alternative embodiment, a finite state machine is used in place of the saturating counters. Pseudo-Verilog for such an implementation is shown below.

```
assign n_done=n_cnt==N;
assign p_done=p_cnt==P;
assign o_rstn=n_done;
assign cg_en=sync_rstn & (!n_done|p_done);
@always(posedgei_clk or negedge sync_rstn) begin
   if(!sync_rstn) begin
      n_cnt<=0;
      p_cnt<=0;
   end else begin
      if(!n_done)
         n_cnt<=n_cnt+1;
      else if(!p_done)
         p_cnt<=p_cnt+1;
      end
   end
```

An EDA tool may generate the saturating counters of FIG. 5 or another physical implementation in response to a HDL description of the finite state machine above.

Figure 6:
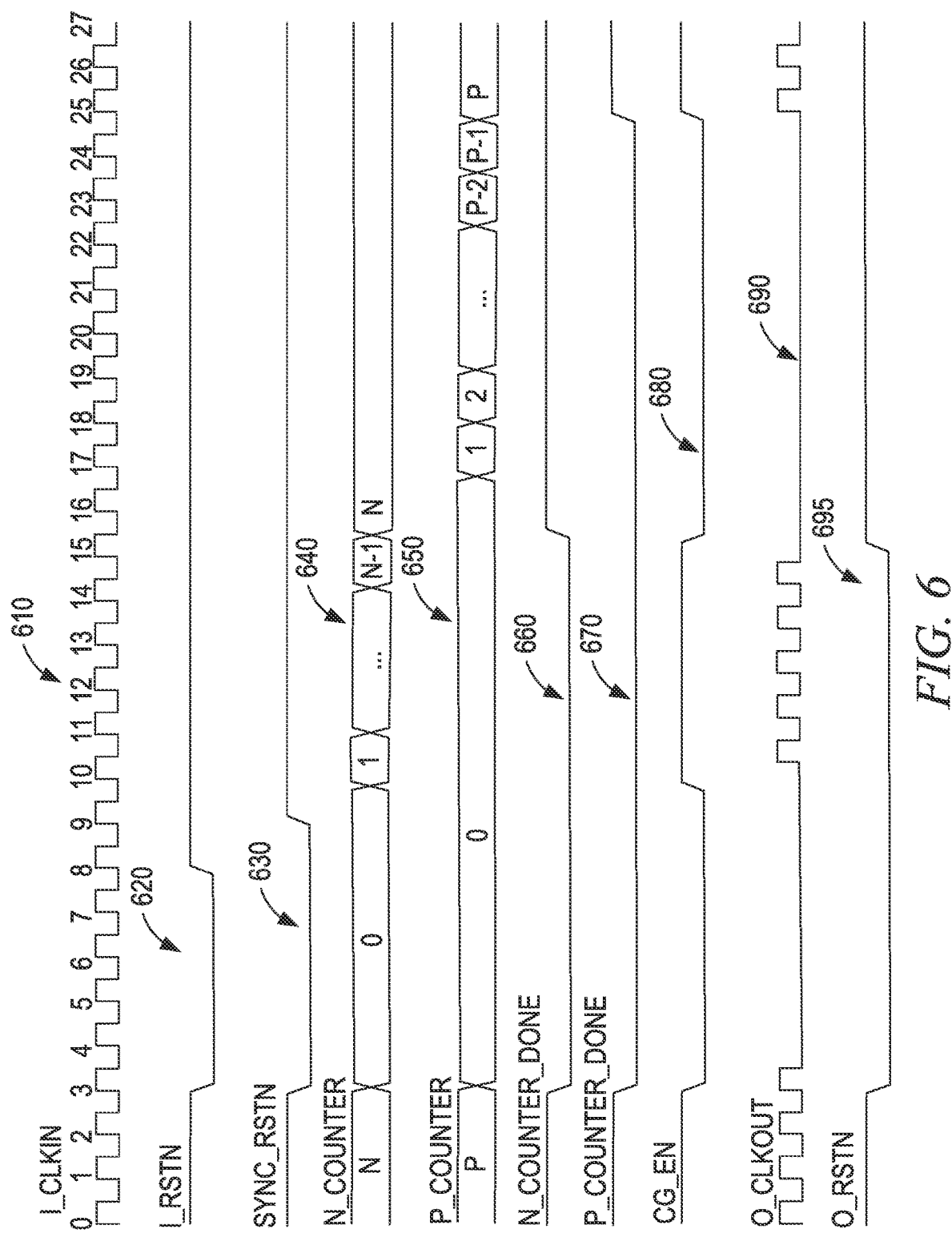
FIG. 6 is a timing diagram for the synchronous reset deassertion circuit of FIG. 5, according to various example embodiments.

FIG. 6 is a timing diagram for the synchronous reset deassertion circuit of FIG. 5, according to various embodiments of the invention. The timing diagram of FIG. 6 shows the I_CLKIN timing 610, the I_RSTN timing 620, the SYNC_RSTN timing 630, the N_COUNTER timing 640, the P_COUNTER timing 650, the N_COUNTER_DONE timing 660, the P_COUNTER_DONE timing 670, the CG_EN timing 680, the O_CLKOUT timing 690, and the O_RSTN timing 695.

The I_CLKIN timing 610 shows a steady clock signal being input to the synchronous reset deassertion circuit 500. The rising clock edges are numbered 0 to 27.

The I_RSTN timing 620 shows that for a first period of time, the input reset signal is inactive, and then reset is asserted near clock cycle 3 and reset is deasserted near clock cycle 8. The duration of time of the assertion of the input reset signal is controlled outside of the synchronous reset deassertion circuit 500 and may be longer or shorter than that shown in FIG. 6.

The SYNC_RSTN timing 630 shows that the SYNC_RSTN signal output from the reset synchronizer 360 is initially inactive, but becomes active as soon as the I_RSTN signal does. After the input reset signal is deasserted, there is a delay before the SYNC_RSTN signal is deasserted. As discussed above with respect to FIG. 3, the delay is three clock cycles when the three flip-flops 370A-370C are used.

The N_COUNTER timing 640 shows the value of the counter 540. When the SYNC_RSTN signal received as the reset signal by the saturating counter 510 is asserted, the value of the counter is reset to zero. The counter 540 does not begin incrementing the value until the next clock edge after the SYNC_RSTN signal is deasserted. Thus, the duration of the period of time that the counter is zero is controlled by the duration of the assertion of the input reset signal and the delay of the reset synchronizer 360. Thereafter, the value increments by one each clock cycle until the predetermined value of N is reached. The duration of the period of time that the counter has a value between zero and N is determined by the value of N and the clock frequency. The N_COUNTER_DONE timing 660 shows that this signal is set to one when the N_COUNTER equals N and set to zero otherwise.

The P_COUNTER timing 650 shows the value of the counter 340. When the N_COUNTER_DONE signal received as the reset signal by the saturating counter 310 is asserted, the value of the counter is reset to zero. The counter 340 does not begin incrementing the value until the next clock edge after the N_COUNTER_DONE signal is deasserted. Thus, the duration of the period of time that the counter is zero is controlled by the duration of the assertion of the input reset signal, the delay of the reset synchronizer 360, and the delay of the saturating counter 510. Thereafter, the value increments by one each clock cycle until the predetermined value of P is reached. The duration of the period of time that the counter has a value between zero and P is determined by the value of P and the clock frequency. The P_COUNTER_DONE timing 670 shows that this signal is set to one when the P_COUNTER equals P and set to zero otherwise.

The CG_EN timing 680 shows that the clock is disabled when the I_RSTN signal is received and re-enabled for N clock cycles while SYNC_RSTN is not asserted and N_COUNTER_DONE is a logical zero. The CG_EN signal is enabled until the next time I_RSTN is asserted after the P_COUNTER_DONE signal is raised.

The O_CLKOUT timing 690 shows that the output clock signal is equal to the clock input while the CG_EN signal is asserted and is a logical zero otherwise. Thus, the output clock signal is disabled while SYNC_RSTN is asserted, enabled for N clock cycles thereafter, disabled for P clock cycles after that, and then enabled thereafter. Accordingly, by selecting the values for P and N, the total delay after the assertion of SYNC_RSTN is selected, along with the portion of that delay that includes an active clock output.

The O_RSTN timing 695 is the same as the N_COUNTER_DONE timing 660 since, in the example circuit of FIG. 5, the output reset signal is coupled to the N_COUNTER_DONE signal from the saturating counter 510.

Figure 7:
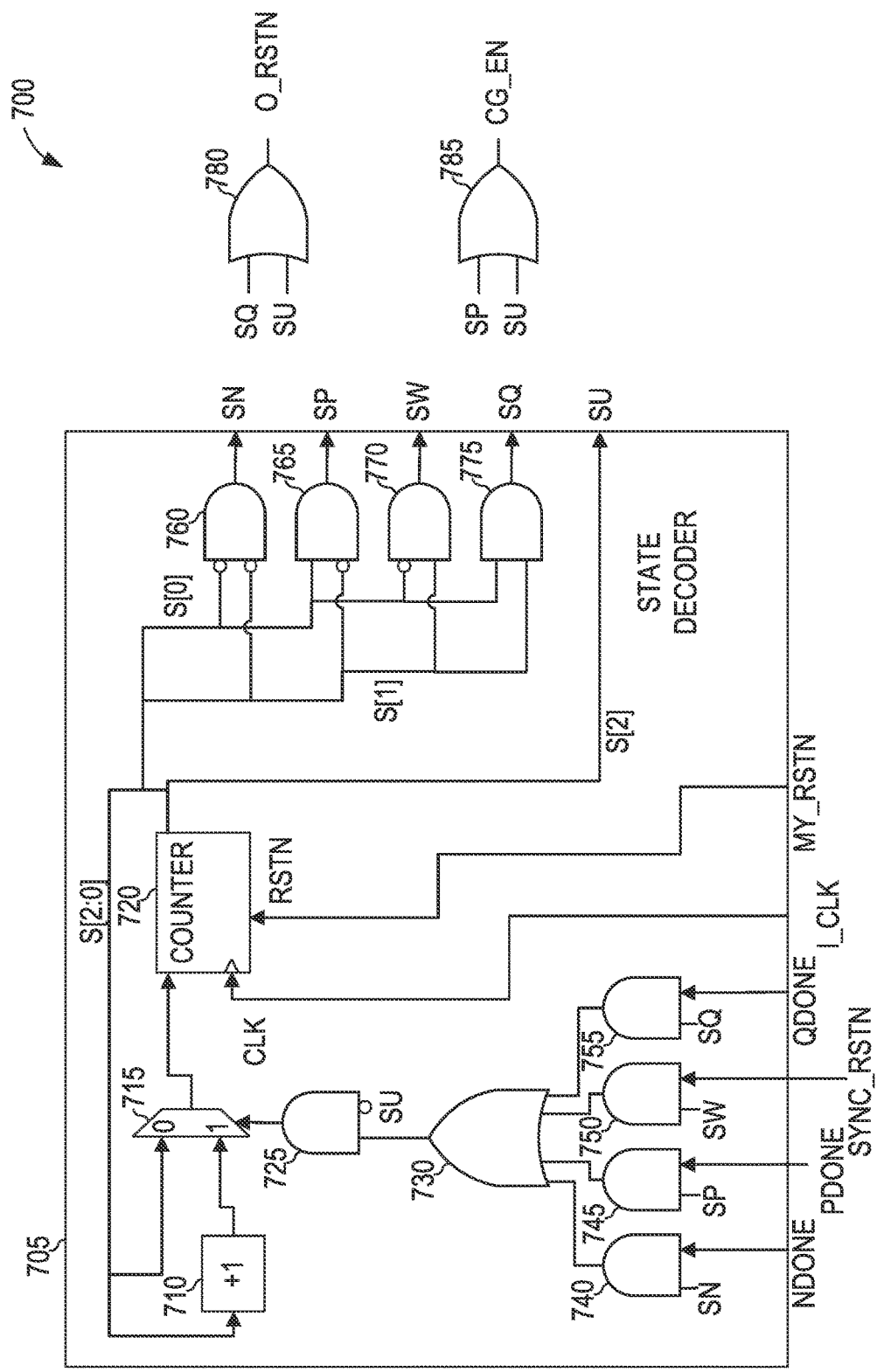
FIGS. 7-9 are diagrammatic views of a synchronous reset deassertion circuit, according to various example embodiments.
Figure 8:
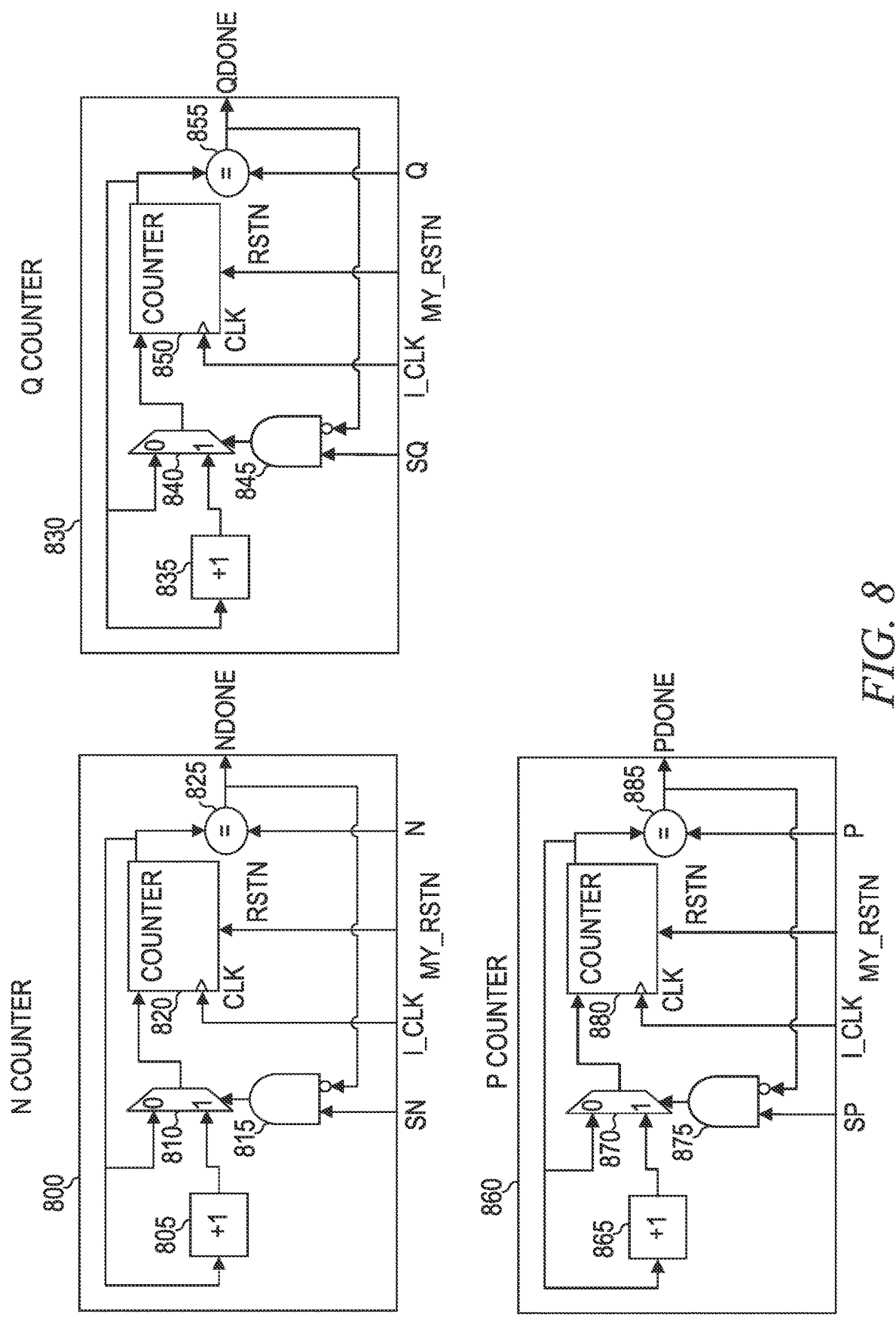
Figure 9:
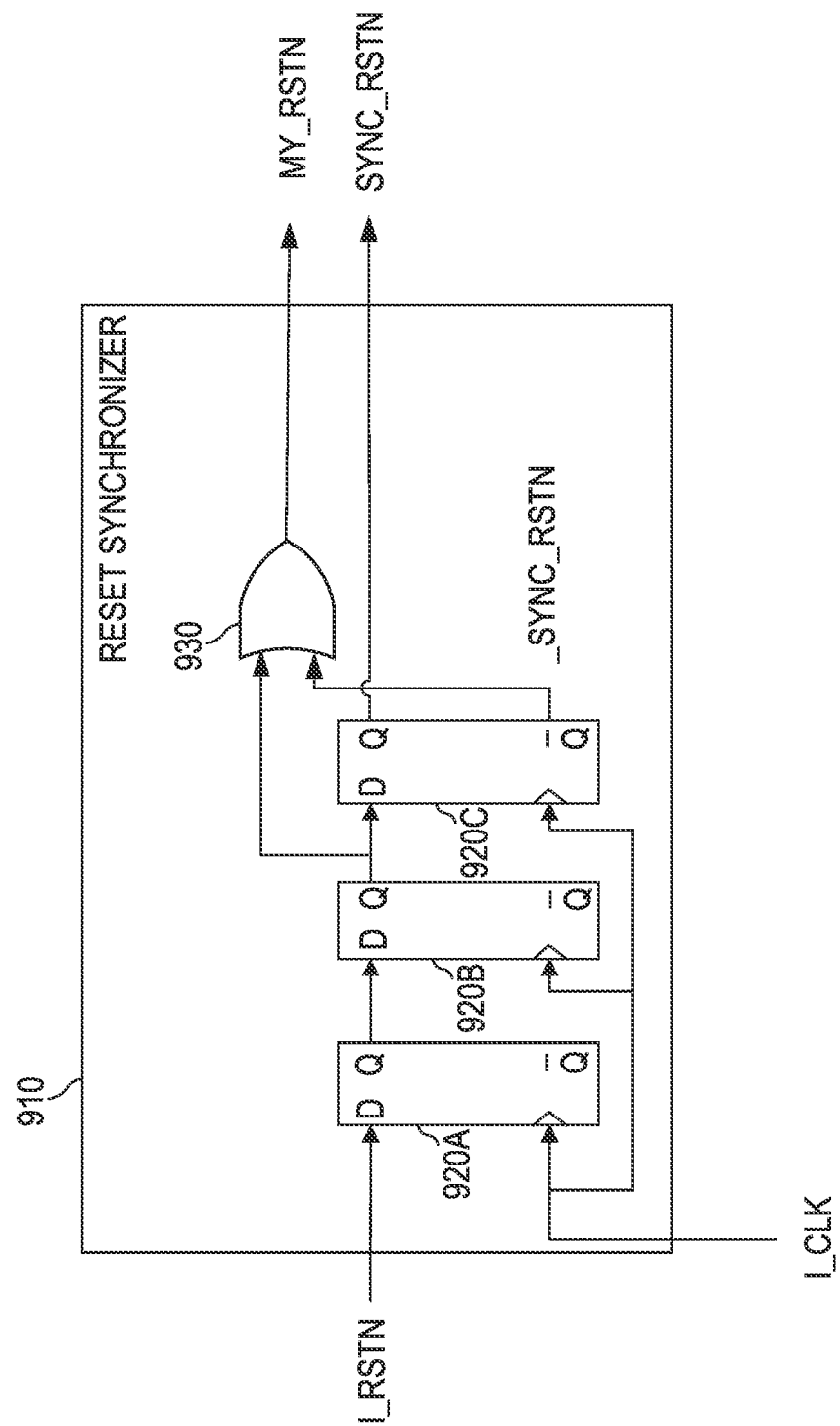

FIGS. 7-9 are diagrammatic views of a synchronous reset deassertion circuit 700, according to various example embodiments. The synchronous reset deassertion circuit 700 includes a state decoder 705 comprising an incrementer 710, a multiplexer 715, counter 720, AND gates 725, 740, 745, 750, 755, 760, 765, 770, and 775, and OR gate 730. The synchronous deassertion circuit 700 also includes a reset synchronizer 910 (shown in FIG. 9) to generate the SYNC_RSTN signal received by the state decoder 705 and a clock gating circuit 380 (shown in FIG. 3) that generates an output clock signal based on a clock input and a CG_EN signal. The reset synchronizer 910 also generates the MY_RSTN signal. The CG_EN signal is generated by an OR gate 785. Another output of the synchronous deassertion circuit 700 is the output reset signal, O_RSTN, generated by an OR gate 780. An N counter 800, a Q counter 830, and a P counter 860, all shown in FIG. 8, are also part of the synchronous deassertion circuit 700, generating NDONE, QDONE, and PDONE signals received as inputs by the state decoder 705. To improve visibility, some internal connections are labeled rather than indicated by lines.

In response to an input reset signal, the MY_RSTN signal is put in an active state for a single clock cycle by the reset synchronizer 910 and then deasserted. The state decoder 705, the N counter 800, the Q counter 830, and the P counter 860 are all reset in response to the MY_RSTN signal. Once the MY_RSTN signal is deasserted, these circuits return to operation even though the input reset signal remains asserted.

The N counter 800 includes an incrementer 805, a multiplexer 810, an AND gate 815, a counter 820, and a comparator 825. While the value of the counter 820 is not equal to N, as determined by the comparator 825, and the SN signal is active, the multiplexer 810 selects the output of the incrementer 805 as the input to the counter 820, causing the counter 820 to increment its value with every clock cycle. While the value of the counter 820 is equal to N, the NDONE output signal is raised. In response to a MY_RSTN signal, the value of the counter 820 is reset to 1.

The Q counter 830 includes an incrementer 835, a multiplexer 840, an AND gate 845, a counter 850, and a comparator 855. Operation of the Q counter 860 is similar to the operation of the N counter 800. Likewise, the P counter 860 includes an incrementer 865, a multiplexer 870, an AND gate 875, a counter 880, and a comparator 885 and operates in a similar manner to the N counter 800 and the Q counter 830.

The state decoder 705 activates, at any given time, one of the output signals SN, SP, SW, SQ, and SU. The active output signal indicates whether the current state is the N state, the P state, the Wait state, the Q state, or the User state. The AND gates 725 and 740-755, in combination with the OR gate 730, control the multiplexer 715. When the output of the AND gate 725 is one, the multiplexer 715 selects the output of the incrementer 710 as the next value for the counter 720, incrementing the state of the state decoder 705. Otherwise, the value of the counter 720 remains unchanged.

The AND gates 740-755 will cause the output of the OR gate 730 to be one whenever any of the following conditions are met: the current state of the state decoder 705 is the N state and NDONE is asserted by the N counter 800; the current state of the state decoder 705 is the P state and PDONE is asserted by the P counter 860; the current state of the state decoder 705 is the Wait state and the SYNC_RSTN signal is deasserted; or the current state of the state decoder 705 is the Q state and QDONE is asserted by the Q counter 830. The AND gate 725 prevents the state of the state decoder 705 from being changed when the state decoder 705 is in the User state.

The AND gates 760-775 determine which of the five states the state decoder 705 is in based on a 3-bit value from the counter 720. As can be seen by inspection of the inverters on the inputs of the AND gates 760-775, the SN signal is asserted when S[1:0] is 0, the SP signal is asserted when S[1:0] is 1, the SW signal is asserted when S[1:0] is 2, and the SQ signal is asserted when S[1:0] is 3. The SU signal is asserted when S[2] is 1.

Thus, the counter 720 is reset when the MY_RSTN signal is received, and then moves through the N counter, P counter, Wait, Q counter, and User states. The O_RSTN signal is generated by the OR gate 780 when the state decoder 705 is in the Q state or the User state. The CG_EN signal is generated by the OR gate 785 when the state decoder 705 is in the P state or the User state. Thus, in the N state, the synchronous reset deassertion circuit 700 asserts the active-low reset signal and disables the clock signal. In the P state, the synchronous reset deassertion circuit 700 continues to assert the active-low reset signal but enables the clock signal. During the Wait state, the synchronous reset deassertion circuit 700 continues to assert the active-low reset signal and disables the clock signal. The Wait state is left when the SYNC_RSTN signal is deasserted, at which time the Q state is entered and the O_RSTN signal is deasserted. After Q clock cycles, QDONE is asserted, the User state is entered, O_RSTN is raised (deasserting the reset signal), and CG_EN is enabled, restoring the circuit being controlled by the synchronous reset deassertion circuit 700 to its ordinary operating functionality.

The state decoder 705 may be generated using the pseudo-Verilog below.

```
@always(posedge i_clk or negedge my_rstn) begin
    if (!my_rstn) begin
        n_cnt <= 1;
        p_cnt <= 1;
        q_cnt <= 1;
        cg_en <= 0;
        rstn_gen <= 0;
        state <= N_COUNTING;
    end
    else begin
        case(state)
            N_COUNTING: begin
                if(n_cnt < N) begin
                    n_cnt <= n_cnt + 1;
                end
                else begin
                    state <= P_COUNTING;
                    cg_en <= 1;
                end
            end
            P_COUNTING: begin
                if(p_cnt < P) begin
                    p_cnt <= p_cnt + 1;
                end
                else begin
                    state <= WAIT_FOR_I_RST_DEASSERT;
                    cg_en <= 0;
                end
            end
            WAIT_FOR_I_RST_DEASSERT: begin
                if(sync_rstn) begin
                    state <= Q_COUNTING;
                    rstn_gen <= 1;
                    end
                end
            Q_COUNTING: begin
                if(q_cnt < Q) begin
                    q_cnt <= q_cnt + 1;
                end
                else begin
                    state <= USERMODE;
                    cg_en <= 1;
                end
            end
            USERMODE: state <= USERMODE;
        endcase
    end
end
```

The state machine described above can be easily extended to add extra states and counters. For example, if a requirement arose for a state between WAIT and Q_COUNTING such that the clock is turned on again when "i_async_rstn" is deasserted, but before "o_rstn" is deasserted, then an "R_COUNTING" state as below could be added with appropriate modification to the WAIT_FOR_I_RST_DEASSERT and Q_COUNTING states.

```
    WAIT_FOR_I_RST_DEASSERT: begin
       if(sync_rstn) begin
          state<=R_COUNTING;
          cg_en<=1;
       end
    end
    R_COUNTING: begin
       if(r_cnt<R) begin
          r_cnt<=r_cnt+1;
       end
       else begin
          state<=Q_COUNTING;
          rstn_gen<=1;
          cg_en<=0;
       end
    end
    Q_COUNTING: begin
       if(q_cnt<Q) begin
          q_cnt<=q_cnt+1;
       end
       else begin
          state<=USERMODE;
          cg_en<=1;
       end
    end
```

It should also be noted, because of the richness of the synthesizable subset of language features of Verilog available to designers, that there are many widely accepted ways of describing state machines in an HDL like Verilog. In addition, other HDLs such as VHDL bring their own styles of specifying a state-machine to the table. However, for any person having ordinary skill in the art, it would be straightforward to translate the state-machine described above into a different HDL or HDL-style, and the above pseudo-HDL should be viewed as only an example embodiment of the key features of the state-machine. It should also be further noted that the counters in the state machine could be either implicitly (via the hardware synthesis tool) or explicitly reduced to a single counter with appropriate control signals and a maximum count capability of max (N, P, Q, . . . ).

The reset synchronizer 910 includes flip-flops 920A, 920B, and 920C as well as OR gate 930. For inputs, the reset synchronizer 910 receives an input clock signal (I_CLK) and an asynchronous reset signal (I_RSTN). The reset synchronizer 910 generates a SYNC_RSTN signal and a MY_RSTN signal as outputs. As discussed above with respect to FIGS. 7-8, the MY_RSTN signal is asserted for a single clock cycle in response to the I_RSTN signal being asserted. The flip-flops 920A-920C cause a delay of three clock cycles between the receipt of the I_RSTN signal and the assertion of the SYNC_RSTN signal. The OR gate 930 causes the MY_RSTN signal to be asserted only for the clock cycle in which the output of the flip-flop 920B has been changed by the propagation of the I_RSTN signal and the output of the flip-flop 920C has not. As soon as the I_RSTN signal has completed propagation through the flip-flops 920A-920C, the OR gate 930 disables the MY_RSTN signal.

Figure 10:
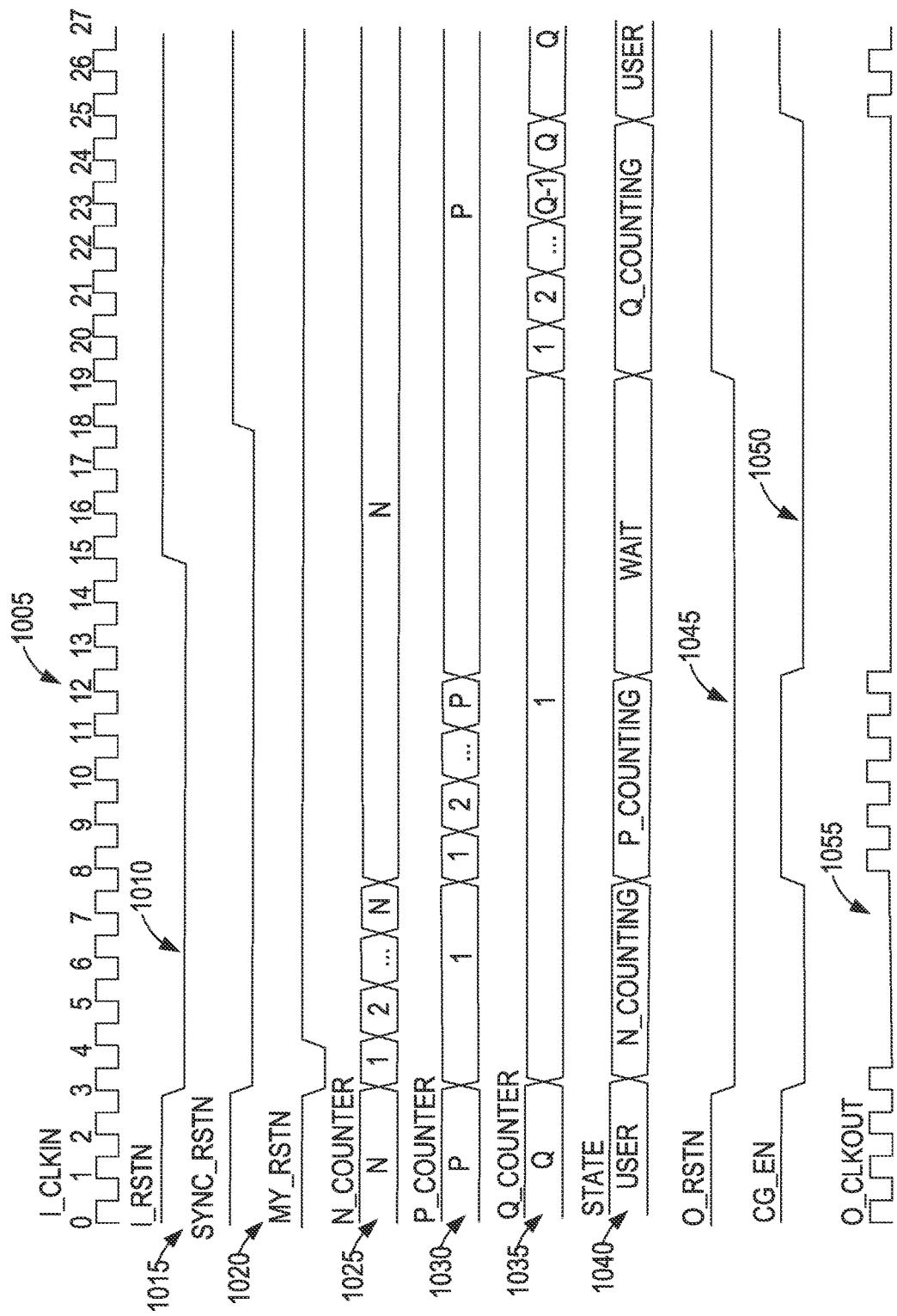
FIG. 10 is a timing diagram for the synchronous reset deassertion circuit of FIGS. 7-9, according to various example embodiments.

FIG. 10 is a timing diagram for the synchronous reset deassertion circuit 700 of FIGS. 7-9, according to various embodiments of the invention. The timing diagram of FIG. 10 shows the I_CLKIN timing 1005, the I_RSTN timing 1010, the SYNC_RSTN timing 1015, the MY_RSTN timing 1020, the N_COUNTER timing 1025, the P_COUNTER timing 1030, the Q_COUNTER timing 1035, the state timing 1040, the O_RSTN timing 1045, the CG_EN timing 1050, and the O_CLKOUT timing 1055.

The I_CLKIN timing 1005 shows a steady clock signal being input to the synchronous reset deassertion circuit 700. The rising clock edges are numbered 0 to 27.

The I_RSTN timing 1010 shows that for a first period of time, the input reset signal is inactive, then reset is asserted near clock cycle 3, and reset is deasserted near clock cycle 15. The duration of time of the assertion of the input reset signal is controlled outside of the synchronous reset deassertion circuit 700 and may be longer or shorter than that shown in FIG. 10.

The SYNC_RSTN timing 1010 shows that the SYNC_RSTN signal output from the reset synchronizer 360 is initially inactive, but becomes active as soon as the I_RSTN signal does. After the input reset signal is deasserted, there is a delay before the SYNC_RSTN signal is deasserted. As discussed above with respect to FIG. 3, the delay is three clock cycles when the three flip-flops 370A-370C are used.

The MY_RSTN timing 1020 shows that the MY_RSTN signal is asserted for a single clock cycle in response the I_RSTN being asserted. The MY_RSTN signal allows for internal reset of the synchronous reset deassertion circuit 700 followed by provision of the synchronous reset deassertion capability.

The state timing 1040 shows which of the five states the state decoder 705 is in at each point in time. Before the I_RSTN signal is asserted, the state decoder 705 is in the User state. When the MY_RSTN signal is asserted, the N counter state is reset to 1. For N clock cycles, the N_COUNTER timing 1025 shows the N counter incrementing with each clock cycle until the value Nis reached. In response to the N counter reaching the value of N, the state timing 1040 shows that the P_COUNTING state is entered. This triggers the P counter to begin incrementing until the P counter reaches the value of P, as shown by the P_COUNTER timing 1030. Thereafter, the state decoder 705 enters the Wait state, and remains in the Wait state until the SYNC_RSTN signal is deasserted. At that time, the state decoder 705 enters the Q_COUNTING state and, as shown by the Q_COUNTER timing 1035, the Q counter begins counting up to Q. When the Q counter reaches Q, the state timing 1040 shows that the state decoder 705 enters the User state.

The O_RSTN timing 1045 shows that the output reset signal is asserted when the input reset signal is asserted, but the output reset signal is not deasserted until the Wait state completes. Thus, even if the I_RSTN signal were deasserted during the N_COUNTING state or the P_COUNTING state, the synchronous deassertion circuit 700 would ensure that those states were complete before leaving the Wait state and deasserting the reset signal. With proper selection of values for N and P, this ensures that the components connected to the synchronous reset deassertion circuit 700 have adequate time to complete their reset processes.

The CG_EN timing 1050 shows that the clock output is initially disabled in response to the reset signal, but is enabled during the P_COUNTING state, allowing connected components to receive clock signals during reset. After the clock is enabled for P cycles, it is again disabled until the User state is reentered and normal operation is resumed. The O_CLKOUT timing 1055 shows that the output clock is controlled by the CG_EN signal.

Figure 11:
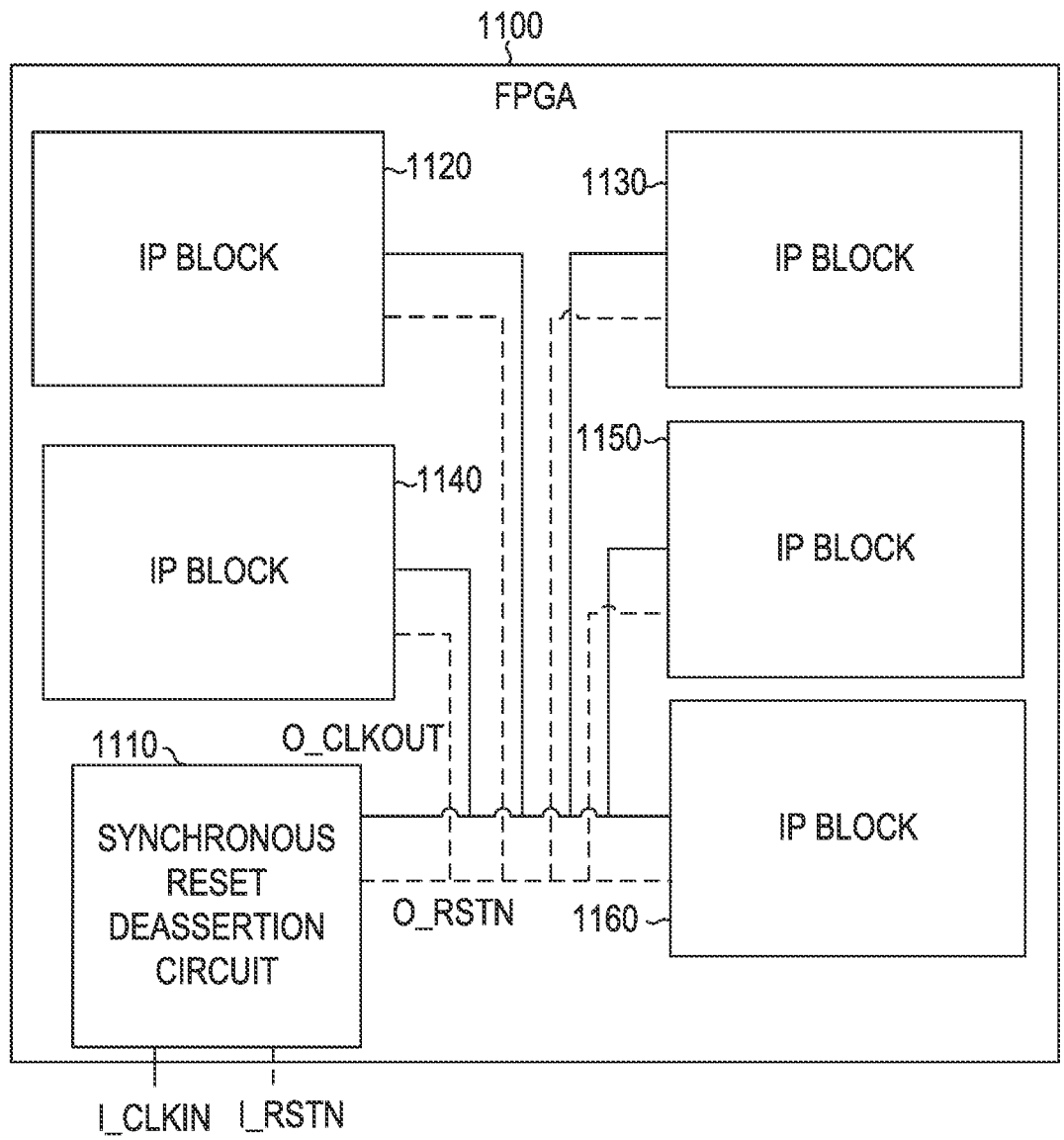
FIG. 11 is a block diagram illustrating components of an FPGA including a synchronous reset deassertion circuit, according to various example embodiments.

FIG. 11 is a block diagram illustrating components of an FPGA 1100 including a synchronous reset deassertion circuit 1110, according to various embodiments of the invention. In addition to the reset deassertion circuit 1110, the FPGA 1100 includes IP blocks 1120, 1130, 1140, 1150, and 1160. For clarity, clock signals are shown with solid lines and reset signals are shown with dashed lines in FIG. 11.

The FPGA 1100 receives a clock input, I_CLKIN, and an input reset signal, I_RSTN. I_CLKIN and I_RSTN are provided as inputs to the synchronous reset deassertion circuit 1110, which may be implemented as described above with respect to FIGS. 3-10. The synchronous reset deassertion circuit 1110 generates an output clock signal, O_CLKOUT, and an output reset signal, O_RSTN. Each of the IP blocks 1120-1160 receives O_CLKOUT and O_RSTN instead of I_CLKIN and I_RSTN. As a result, the synchronous reset deassertion circuit 1110 can control the timing of the assertion of the reset signal, the deassertion of the reset signal, the provision of the clock signal, or any suitable combination thereof.

Accordingly, by configuring the synchronous reset deassertion circuit 1110 to comply with the requirements of the IP blocks 1120-1160, proper operation of the IP blocks 1120-1160 is assured. For example, if the IP block 1120 takes three clock cycles to complete reset, application of the reset signal for fewer than three clock cycles places the IP block 1120 in an indeterminate state. If the I_RSTN signal is coupled to a physical button controlled by a user, the FPGA 1100 may receive a reset signal of any duration. By configuring the synchronous reset deassertion circuit 1110 to ensure that the O_RSTN signal is asserted for at least three clock cycles regardless of the duration of the assertion of the I_RSTN signal, the indeterminate state of the IP block 1120 is avoided.

As another example, the IP block 1120 may be a double data rate (DDR) memory controller whose design specifies that sixteen cycles are needed during reset to ensure that the DDR memory controller is placed in a known state. To support this, N (with reference to the timing diagram of FIG. 6) or P (with reference to the timing diagram of FIG. 10) may be set to at least sixteen, ensuring that at least sixteen clock cycles are received by the IP block 1120 while reset is asserted.

The worst-case reset latency for a particular FPGA 1100 may be measured and divided by the clock frequency to determine the number of clock cycles for which the reset signal is to be held at a constant value to ensure that all IP blocks 1120-1160 receive the signal. The determined number of clock cycles may be used as the value for P (with reference to the timing diagram of FIG. 4) or N (with reference to the timing diagrams of FIGS. 6 and 10).

Though the circuits are generally described herein as being active-high, such that a high voltage indicates a logical 1 or Boolean true value, alternative embodiments that are active-low, such that a low voltage indicates a logical 1 or Boolean true value are contemplated. Thus, an "active" signal may be high or low voltage, depending on the circuit design.

In the foregoing specification, some example implementations of the disclosure have been described. The specification and drawings are, accordingly, to be regarded in an illustrative sense rather than in a restrictive sense. Below is a non-exhaustive list of examples of implementations of the present disclosure.

Example 1 is a circuit comprising: a reset input; a clock input; a reset output; a clock output; a synchronizer block that receives the clock input and the reset input as inputs and generates a synchronized reset output as output; a gating block that receives the clock input and a gating signal as inputs and generates the clock output as output, the clock output being set to the clock input while a first value of the gating signal is received and the clock output having a constant value while a second value of the gating signal is received; and a counter block that: receives the clock input and a counter reset input as inputs and generates a counter block signal as output; and is configured to: in response to the counter reset input being asserted, set the counter block signal to the second value; and in response to the synchronized reset output being deasserted, set the counter block signal to the first value after a predetermined delay.

In Example 2, the subject matter of Example 1 includes, wherein: the synchronized reset output of the synchronizer block is coupled to the reset output of the circuit; the synchronized reset output of the synchronizer block is coupled to the counter reset input of the counter block; and the counter block signal of the counter block is coupled to the gating signal of the gating block.

In Example 3, the subject matter of Examples 1-2 includes, wherein the counter block comprises: a counter that is reset by the reset output and, while not reset, modifies a counter value by one each clock cycle; and a comparator that sets the counter block signal based on the counter value and a predetermined value corresponding to the predetermined delay.

In Example 4, the subject matter of Examples 1-3 includes, a plurality of logic blocks, each logic block of the plurality of logic blocks receiving the reset output and the clock output as inputs.

In Example 5, the subject matter of Examples 1-4 includes, wherein the synchronizer block ensures that the synchronized reset output does not change value within a predetermined amount of time from a change in value of the clock input.

In Example 6, the subject matter of Examples 1-5 includes, a second counter block that: receives the clock input and the synchronized reset output as inputs and generates a second counter block signal as output; and is configured to: in response to the synchronized reset output being asserted, set the second counter block signal to the second value; and in response to the synchronized reset output being deasserted, set the second counter block signal to the first value after a second predetermined delay.

In Example 7, the subject matter of Example 6 includes, wherein: the counter block is a first counter block and the counter block signal is a first counter block signal; the second counter block signal is coupled to the reset output; and the second counter block signal is coupled to the counter reset input of the first counter block.

In Example 8, the subject matter of Example 7 includes, an exclusive nor (XNOR) gate that receives the first counter block signal and the second counter block signal as inputs and generates an XNOR output; a multiplexer that selects between the XNOR output and the first value based on the synchronized reset output to generate a multiplexer output that is coupled to the gating signal of the gating block.

In Example 9, the subject matter of Examples 6-8 includes, wherein the second counter block comprises: a counter that is reset by the synchronized reset output and, while not reset, modifies a counter value by one each clock cycle; and a comparator that sets the second counter block signal based on the counter value and a predetermined value corresponding to the second predetermined delay.

In Example 10, the subject matter of Examples 1-9 includes, wherein: the counter block is a first counter block and the counter block signal is a first counter block signal; and further comprising: a second counter block that: receives the clock input and the first counter block signal as input and generates a second counter block signal as output;

and is configured to: in response to the first counter block signal being asserted, set the second counter block signal to the second value; and in response to the first counter block signal being deasserted, set the second counter block signal to the first value after a second predetermined delay.

In Example 11, the subject matter of Examples 1-10 includes, a state machine that: controls the gating signal of the clock output and the synchronized reset output such that: in a first state, the gating signal has the second value and the synchronized reset output is asserted; in a second state, the gating signal has the first value and the synchronized reset output is asserted; in a third state, the gating signal has the first value and the synchronized reset output is deasserted; and in a fourth state, the gating signal has the second value and the synchronized reset output is deasserted.

Example 12 is a method comprising: receiving a reset input; receiving a clock input; generating, by a synchronizer block, based on the clock input and the reset input, a synchronized reset output; generating, by a gating block, a clock output that is set to the clock input during a first period of time based on a gating signal being equal to a first value during the first period of time; generating, by the gating block, the clock output set to a constant value during a second period of time based on the gating signal being equal to a second value during the second period of time; generating, by a counter block, a counter block signal set to the second value during a third period of time based on a counter reset signal being asserted during the third period of time; and generating, by the counter block, the counter block signal set to the first value during a fourth period of time based on the counter reset signal being deasserted during a fifth period of time, the fourth period of time having a predetermined delay after the fifth period of time.

In Example 13, the subject matter of Example 12 includes, providing the synchronized reset output of the synchronizer block as a reset output; providing the synchronized reset output of the synchronizer block as a counter reset input of the counter block; and providing the counter block signal of the counter block as the gating signal of the gating block.

In Example 14, the subject matter of Example 13 includes, providing the reset output and the clock output as input to a plurality of logic blocks.

In Example 15, the subject matter of Examples 12-14 includes, resetting a counter of the counter block based on the synchronized reset output; during the predetermined delay, modifying a counter value by one each clock cycle; and based on the counter value and a predetermined value corresponding to the predetermined delay, begin the generating of the counter block signal set to the first value during the fourth period of time.

In Example 16, the subject matter of Examples 12-15 includes, ensuring, by the synchronizer block, that the synchronized reset output does not change values within a predetermined amount of time from a change in value of the clock input.

In Example 17, the subject matter of Examples 12-16 includes, generating, by a second counter block, a second counter block signal set to the second value during a sixth period of time based on the synchronized reset output being asserted during the sixth period of time; and generating, by the second counter block, the second counter block signal set to the first value during a seventh period of time based on the synchronized reset output being deasserted during an eighth period of time, the seventh period of time having a second predetermined delay after the eighth period of time.

In Example 18, the subject matter of Example 17 includes, wherein: the counter block is a first counter block and the counter block signal is a first counter block signal; and further comprising: providing the second counter block signal as a reset output; and providing the second counter block signal as a counter reset input of the first counter block.

In Example 19, the subject matter of Example 18 includes, selecting, based on the synchronized reset output, either the first value or an exclusive nor (XNOR) of the first counter block signal and the second counter block signal; and providing the selected value as the gating signal of the gating block.

In Example 20, the subject matter of Examples 17-19 includes, using the synchronized reset output to reset a counter that, while not reset, modifies a counter value by one each clock cycle; and setting the second counter block signal based on the counter value and a predetermined value corresponding to a third predetermined delay.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

The Abstract of the Disclosure is provided to comply with 37 C.F.R. § 1.72 (b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A circuit comprising:
   a counter block that:
      receives a clock input and a counter reset input as inputs and generates a counter block signal as output; and
      is configured to:
         in response to the counter reset input being asserted, set the counter block signal to a first value; and
         in response to the counter reset input being deasserted, set the counter block signal to a second value after a predetermined delay; and
   a gating block that receives the clock input and a gating signal as inputs and generates a clock output as output, the clock output being set to the clock input while a first gating signal value is received and the clock output having a constant value while a second gating signal value is received.

2. The circuit of claim 1, further comprising:
   a synchronizer block that receives the clock input and a reset input as inputs and generates a synchronized reset output as output, the synchronized reset output of the synchronizer block being coupled to the counter reset input of the counter block.

3. The circuit of claim 2, further comprising:
a reset output coupled to the synchronized reset output.

4. The circuit of claim 3, further comprising:
a plurality of logic blocks, each logic block of the plurality of logic blocks receiving the reset output as input.

5. The circuit of claim 2, wherein the synchronizer block ensures that the synchronized reset output does not change value within a predetermined amount of time from a change in value of the clock input.

6. The circuit of claim 2, further comprising:
a second counter block that:
  receives the clock input and the synchronized reset output as inputs and generates a second counter block signal as output; and
  is configured to:
    in response to the synchronized reset output being asserted, set the second counter block signal to the first value; and
    in response to the synchronized reset output being deasserted, set the second counter block signal to the second value after a second predetermined delay.

7. The circuit of claim 1, wherein:
the counter block signal of the counter block is coupled to the gating signal of the gating block.

8. The circuit of claim 1, further comprising:
a plurality of logic blocks, each logic block of the plurality of logic blocks receiving the clock output as input.

9. The circuit of claim 1, wherein the counter block comprises:
a counter that is reset by a reset output and, while not reset, modifies a counter value by one each clock cycle; and
a comparator that sets the counter block signal based on the counter value and a predetermined value corresponding to the predetermined delay.

10. The circuit of claim 1, wherein the counter block is implemented as a state machine that:
controls the gating signal and a synchronized reset output such that:
  in a first state, the gating signal has the first value and the synchronized reset output is asserted;
  in a second state, the gating signal has the second value and the synchronized reset output is asserted;
  in a third state, the gating signal has the second value and the synchronized reset output is deasserted; and
  in a fourth state, the gating signal has the first value and the synchronized reset output is deasserted.

11. The circuit of claim 1, wherein the counter block is implemented as a saturating counter.

12. A method comprising:
generating, by a counter block and based on a clock input and a counter reset input, a counter block signal as output;
in response to the counter reset input being asserted, setting, by the counter block, the counter block signal to a first value;
in response to the counter reset input being deasserted, setting, by the counter block, the counter block signal to a second value after a predetermined delay; and
generating, by a gating block, a clock output based on the clock input and a gating signal, the clock output being set to the clock input while a first gating signal value is received and the clock output having a constant value while a second gating signal value is received.

13. The method of claim 12, further comprising:
generating, by a synchronizer block that receives the clock input and a reset input as inputs, a synchronized reset output as output, the synchronized reset output of the synchronizer block being coupled to the counter reset input of the counter block.

14. The method of claim 13, wherein the synchronizer block ensures that the synchronized reset output does not change value within a predetermined amount of time from a change in value of the clock input.

15. The method of claim 13, further comprising:
generating, by a second counter block and based the clock input and the synchronized reset output, a second counter block signal as output;
in response to the synchronized reset output being asserted, setting, by the second counter block, the second counter block signal to the first value; and
in response to the synchronized reset output being deasserted, setting, by the second counter block, the second counter block signal to the second value after a second predetermined delay.

16. The method of claim 13, further comprising providing the synchronized reset output to a plurality of logic blocks.

17. The method of claim 12, wherein:
the counter block signal of the counter block is coupled to the gating signal of the gating block.

18. The method of claim 12, further comprising providing the clock output to a plurality of logic blocks.

19. The method of claim 12, further comprising:
resetting, by the counter block, a counter value in response to receiving a reset output; and
while the reset output is not received, modifying the counter value by one each clock cycle.

20. The method of claim 12, wherein the counter block is implemented as a saturating counter.

* * * * *